(12) United States Patent
Busch-Sorensen

(10) Patent No.: US 10,282,920 B2
(45) Date of Patent: May 7, 2019

(54) RFID FOR FARE COLLECTION

(71) Applicant: Cubic Corporation, San Diego, CA (US)

(72) Inventor: Thomas Busch-Sorensen, San Diego, CA (US)

(73) Assignee: Cubic Corporation, San Diego, CA (US)

( * ) Notice: Subject to any disclaimer, the term of this patent is extended or adjusted under 35 U.S.C. 154(b) by 32 days.

(21) Appl. No.: 15/184,736

(22) Filed: Jun. 16, 2016

(65) Prior Publication Data

US 2016/0371893 A1    Dec. 22, 2016

Related U.S. Application Data

(60) Provisional application No. 62/182,266, filed on Jun. 19, 2015.

(51) Int. Cl.
| | |
|---|---|
| *G07B 15/04* | (2006.01) |
| *G07B 15/02* | (2011.01) |
| *G06Q 20/32* | (2012.01) |
| *G07C 9/00* | (2006.01) |

(Continued)

(52) U.S. Cl.
CPC .......... *G07B 15/04* (2013.01); *G06K 7/10128* (2013.01); *G06K 7/10356* (2013.01);
(Continued)

(58) Field of Classification Search
None
See application file for complete search history.

(56) References Cited

U.S. PATENT DOCUMENTS

| 6,966,491 B2 | 11/2005 | Gyger |
|---|---|---|
| 7,026,924 B2 | 4/2006 | Degrauwe et al. |

(Continued)

FOREIGN PATENT DOCUMENTS

| EP | 0826290 A1 | 3/1998 |
|---|---|---|
| EP | 1220163 A1 | 7/2002 |

(Continued)

OTHER PUBLICATIONS

International Search Report and Written Opinion dated Sep. 16, 2016 for International Application No. PCT/US2016/038039, filed Jun. 17, 2016; all pages.

(Continued)

*Primary Examiner* — Tonya Joseph
(74) *Attorney, Agent, or Firm* — Kilpatrick Townsend & Stockton

(57) ABSTRACT

Systems and methods for RFID fare collection for improving passenger throughput and security in transit systems. RFID tags identify passengers at a distance and allow a hands-free experience for transit users. The system includes gate cabinets and/or other entry points that define a passageway and separate a non-restricted access area from a restricted access area, at least one RFID transmitter positioned on the entry points, at least one RFID receiver positioned on the entry points, and a processor coupled with the RFID receiver. The system detects the presence of the RFID tag within the passageway and detects information linking to the account balance of the user. The system determines whether transit users are entering or exiting the restricted access area based on analysis of the wireless signals received by the RFID receivers, and provides an alarm signal when a transit user is not permitted to access the restricted access area.

13 Claims, 16 Drawing Sheets

(51) Int. Cl.
  *G08B 13/22* (2006.01)
  *G06K 7/10* (2006.01)
  *G06K 17/00* (2006.01)
  *G06Q 50/30* (2012.01)

(52) U.S. Cl.
  CPC ..... *G06K 7/10425* (2013.01); *G06Q 20/3278* (2013.01); *G07B 15/02* (2013.01); *G07C 9/00111* (2013.01); *G08B 13/22* (2013.01); *G06K 2017/0045* (2013.01); *G06Q 50/30* (2013.01)

(56) References Cited

U.S. PATENT DOCUMENTS

| | | | |
|---|---|---|---|
| 7,323,996 B2 | 1/2008 | Mullins | |
| 7,764,176 B2 | 7/2010 | Zhang et al. | |
| 2004/0070501 A1 | 4/2004 | Degrauwe et al. | |
| 2004/0093281 A1* | 5/2004 | Silverstein | G06Q 20/04 705/26.8 |
| 2005/0001029 A1 | 1/2005 | Gyger | |
| 2005/0216344 A1* | 9/2005 | Collet | G06Q 20/12 705/14.26 |
| 2007/0030150 A1 | 2/2007 | Mullins | |
| 2007/0290860 A1* | 12/2007 | Lucas | G06K 7/0008 340/572.7 |
| 2008/0156873 A1* | 7/2008 | Wilhelm | G07B 15/00 235/384 |
| 2009/0045955 A1* | 2/2009 | Ulrich | G06Q 20/208 340/572.1 |
| 2009/0153333 A1 | 6/2009 | Zhang et al. | |
| 2009/0321510 A1* | 12/2009 | Day | G06K 7/0008 235/375 |
| 2014/0193007 A1* | 7/2014 | Solum | H04R 25/40 381/313 |
| 2015/0048159 A1* | 2/2015 | Martinez de Velasco Cortina | G06Q 20/3227 235/379 |

FOREIGN PATENT DOCUMENTS

| | | |
|---|---|---|
| EP | 2138981 A2 | 12/2009 |
| WO | 2016/205617 A1 | 12/2016 |

OTHER PUBLICATIONS

International Preliminary Report on Patentability dated Dec. 28, 2017 for PCT/US2016/038039; all pages.

* cited by examiner

RFID FOR FARE COLLECTION

CROSS-REFERENCE TO RELATED APPLICATIONS

The present application is a nonprovisional of and claims benefit under 35 USC § 119(e) of U.S. Provisional Application No. 62/182,266, filed on Jun. 19, 2015, entitled RFID FOR FARE COLLECTION, of which the entire disclosure is incorporated herein by reference for all purposes.

BACKGROUND OF THE INVENTION

Fare collection for public and private transportation systems generally requires that the transit user purchases a paper ticket prior to entry into the transportation system, followed by the user presenting the purchased ticket at a gate either to a machine (in an automated fare collection system) or to a transit personnel. As transportation systems become burdened with increased ridership, ticketing gates become increasingly congested, causing delays to transit users and increased costs to the transportation systems. Another issue exists where transportation systems are unable to provide a hands-free approach for wheelchair users who may have difficulty presenting a paper ticket prior to entry. Systems and methods for increased efficiency in the area are needed.

BRIEF SUMMARY OF THE INVENTION

A radio-frequency identification (RFID) fare collection system is provided. The system may include at least one entry point that defines a passageway and separates a non-restricted access area from a restricted access area. The system may also include an RFID tag operable to be carried by a user when the user enters or exits the restricted access area through the passageway. The RFID tag may have information linking to an account balance of the user. The system may further include at least one RFID transmitter positioned on or within a threshold distance of the at least one entry point. The at least one RFID transmitter may be configured to transmit wireless signals to the RFID tag. In some embodiments, the system may include at least one RFID receiver positioned on or within the threshold distance of the at least one entry point. The at least one RFID receiver may be configured to receive wireless signals from the RFID tag. The wireless signals received by the at least one RFID receiver from the RFID tag may be indicative of the information linking to the account balance of the user. The system may also include a processor communicatively coupled with the at least one RFID receiver. The processor may be configured to perform several operations. The operations may include detecting the presence of the RFID tag within the passageway. The operations may also include detecting the information linking to the account balance of the user based on the wireless signals received by the at least one RFID receiver from the RFID tag.

In some embodiments, the processor is further configured to perform operations including accessing the account balance of the user to determine whether the user is permitted to access the restricted access area. In some embodiments, the processor is further configured to perform operations including initiating an alarm signal when the user is not permitted to access the restricted access area. In some embodiments, the processor is further configured to perform operations including determining whether the user is entering or exiting the restricted access area based on the wireless signals received by the at least one RFID receiver from the RFID tag.

The RFID fare collection system may include a first RFID receiver and a second RFID receiver. In some embodiments, the operation of determining whether the user is entering or exiting the restricted access area may include detecting receipt, by the first RFID receiver, of a first received wireless signal having a first maximum amplitude at a first instant in time, detecting receipt, by the second RFID receiver, of a second received wireless signal having a second maximum amplitude at a second instant in time, and comparing the first instant in time with the second instant in time to determine whether the user is entering or exiting the restricted access area.

In some embodiments, the operation of determining whether the user is entering or exiting the restricted access area may include detecting receipt, by the first RFID receiver, of a first received wireless signal, where the first received wireless signal surpasses an amplitude threshold at a first instant in time, detecting receipt, by the second RFID receiver, of a second received wireless signal, where the second received wireless signal surpasses the amplitude threshold at a second instant in time, and comparing the first instant in time with the second instant in time to determine whether the user is entering or exiting the restricted access area.

In some embodiments, the operation of determining whether the user is entering or exiting the restricted access area may include detecting receipt, by the first RFID receiver, of a first received wireless signal having a first frequency at a first instant in time, detecting receipt, by the second RFID receiver, of a second received wireless signal having a second frequency at the first instant in time, and comparing the first frequency with the second frequency to determine whether the user is entering or exiting the restricted access area.

In some embodiment, the RFID tag is passive. In some embodiments, the system includes at least one RFID transceiver positioned on or within the threshold distance of the at least one entry point. The at least one RFID transceiver may include the at least one RFID transmitter and the at least one RFID receiver such that the at least one RFID transmitter is integrated with the at least one RFID receiver. In some embodiments, the processor is integrated with the at least one RFID receiver. In some embodiments, the RFID tag is a UHF tag, the at least one RFID transmitter is a UHF transmitter, and the at least one RFID receiver is a UHF receiver. A method to implement the described system is also provided.

BRIEF DESCRIPTION OF THE DRAWINGS

The accompanying drawings, which are included to provide a further understanding of the invention, are incorporated in and constitute a part of this specification, illustrate embodiments of the invention and together with the detailed description serve to explain the principles of the invention. No attempt is made to show structural details of the invention in more detail than may be necessary for a fundamental understanding of the invention and various ways in which it may be practiced.

Figure 1:
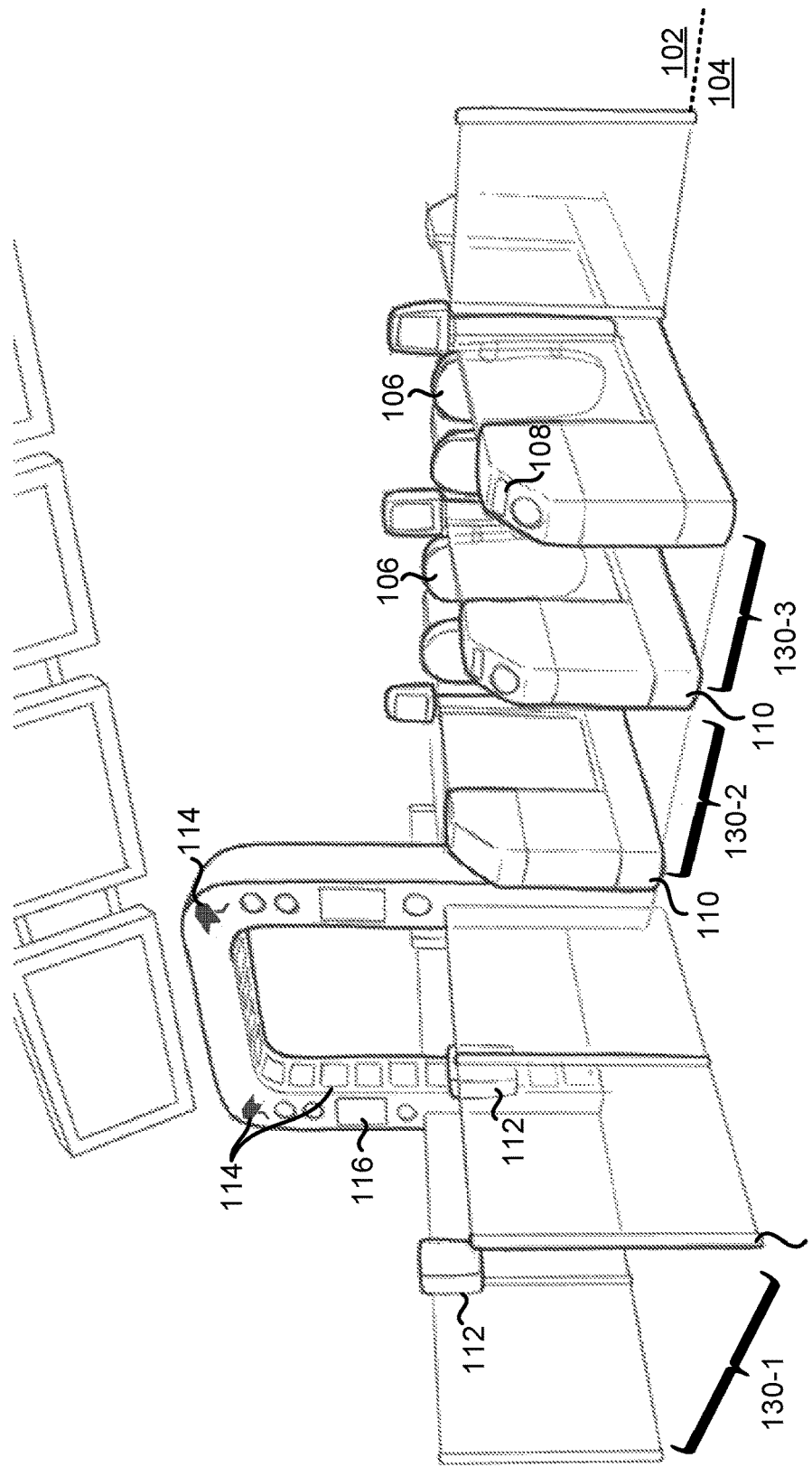
FIG. 1 shows a perspective view of a gate array, according to some embodiments of the present disclosure.

In the appended figures, similar components and/or features may have the same numerical reference label. Further, various components of the same type may be distinguished by following the reference label by a dash followed by a second numerical reference label that distinguishes among the similar components and/or features. If only the first numerical reference label is used in the specification, the description is applicable to any one of the similar components and/or features having the same first numerical reference label irrespective of the suffix.

DETAILED DESCRIPTION OF THE INVENTION

Various specific embodiments will be described below with reference to the accompanying drawings constituting a part of this specification. It should be understood that, although structural parts and components of various examples of the present disclosure are described by using terms expressing directions, e.g., "front", "back", "upper", "lower", "left", "right" and the like in the present disclosure, these terms are merely used for the purpose of convenient description and are determined on the basis of exemplary directions displayed in the accompanying drawings. Since the embodiments disclosed by the present disclosure may be set according to different directions, these terms expressing directions are merely used for describing rather than limiting. Under possible conditions, identical or similar reference numbers used in the present disclosure indicate identical components.

Systems, methods, and techniques are provided in the present disclosure for implementing an RFID fare collection system. The RFID fare collection system described herein may improve passenger throughput across stations and lines of a city rapid transit system without the need for expanding current transit systems with additional gates and transit personnel. RFID tags may identify passengers at a distance and allow a hands-free experience for transit users. RFID tags may also provide information linking to the account balances of the transit users. This allows for easy adjustment of a user's account in response to the user passing through an RFID-enabled gate. The RFID fare collection system may also determine whether transit users are entering or exiting a restricted access area based on analysis of the wireless data received by the RFID readers at the RFID-enabled gates. The system further provides an alarm signal when a transit user is not permitted to access a restricted access area. The RFID fare collection system described herein may be implemented in many types of public and private transportation systems, including airlines, taxis, city buses, long-distance buses, trolleybuses, trams, light rail, rapid transit, people movers, commuter rail, monorail suspension railways, personal rapid transit, ferries, and the like. The term "restricted access area" may have different meanings in different transportation systems. For example, in a light rail transportation system, the restricted access area may include both the inside of the trains and the platforms surrounding the train tracks. In a city bus transportation system, the restricted access area may only include the inside of the bus.

In some embodiments, the RFID fare collection system described herein may comprise a barrier placed across the RFID-enabled gate in substitute of or in addition to the alarm signal. The barrier may be retracted when it is determined that a transit user is properly entering or exiting a restricted access area, or conversely, the barrier may be placed when a transit user is improperly entering or exiting a restricted access area. In other words, the RFID-enabled gates described herein may comprise barriers or may be barrierless.

Used herein, the term "RFID" may refer to any communication technology employing electromagnetic fields to identify and track stationary or moving objects. The term "RFID tag" may refer to any communication device that may be carried by or secured to an object. RFID tags may be passive, active, or battery-assisted passive. Active RFID tags have on-board batteries and periodically or constantly transmit wireless signals with identifying information. Battery-assisted passive RFID tags have small batteries on board and are activated when they are near an RFID reader. Passive RFID tags lack on-board batteries and are instead energized by the wireless signals received from RFID readers. RFID tags may have individual serial numbers or IDs that allow each individual RFID tag to be identified from among a larger group. In some embodiments, an RFID tag may be a credit card sized carrier or a key fob. RFID tags may operate in a 13.56 MHz band (HF), a 900 MHz band (UHF), or a 2.4 GHz band, among others. In some embodiments, UHF tags may co-exist with HF tags and vice-versa. In some embodiments, RFID tags may be used as tokens in an account based system so that only a serial number needs to be read to access an account. In other embodiments, a system may interact with the RFID tags and read and write data to them. For example, instead of an RFID tag containing information for linking to an account via a serial number or ID, the tag may ping back modifiable information regarding a balance. In some embodiments, an RFID tag may support mutual authentication to prevent spoofing or replay attacks. In some embodiments, active RFID tags may be turned on and off by a user pressing a button on or near the RFID tag. For example, a wheelchair user may press a button fixed to their wheelchair to power an active RFID tag. Such embodiments may save power and preserve battery life.

Used herein, the term "RFID reader" may refer to any communication device that may transmit and/or receive wireless signals to or from an RFID tag. The term "RFID reader" may be used interchangeably with the terms "RFID transceiver", "RFID transmitter", "RFID receiver", "transceiver", "transmitter", "receiver", "transmitter antenna", "receiver antenna", and "antenna". For example, in embodiments where several transceivers are disclosed as being positioned along the side of a gate cabinet and/or entry point, some embodiments may include transmitters and/or receivers being positioned along the side of the gate cabinet. Similarly, in embodiments where several antennas are disclosed as being positioned along the side of a gate cabinet and/or entry point, some embodiments may include RFID transceivers, RFID transmitters, and/or RFID receivers as being positioned along the side of the gate cabinet and/or entry point.

An RFID transmitter may be a narrow beam antenna or an omnidirectional antenna, which, in some embodiments may cover a 180 degree hemisphere. An RFID fare collection system may comprise a single RFID transmitter or multiple transmitters. Similarly, an RFID receiver may be a narrow beamwidth antenna or an omnidirectional antenna. In some embodiments, a narrow beam antenna may be focused to eliminate unfavorable near field patterns. In some embodiments, multiple RFID receivers may share antenna elements in a phased array fashion, or may be individual, larger antennas for different channels. An RFID fare collection system may comprise RFID receivers on one side or both sides of a passageway. In some embodiments, antennas may have circular polarization so that they can communicate with RFID tags regardless of their orientation.

FIG. 1 shows a perspective view of a gate array 100, according to some embodiments of the present disclosure. In general, the gate array 100 may be similar to a typical gateline used in transportation systems or environments. For example, the gate array 100 may include a plurality of RFID-enabled gates 130 and gate cabinets 110 (or other types of entry points) which create passageways through the gate array 100. In some embodiments, the RFID-enabled gates 130 may contain gate barriers 106 such as gate 130-2 and gate 130-3. The gate barriers 106 may comprise various types of physical barriers to impede access to a restricted access area 102, such as turnstiles, sliding doors, boom gates, or the gate barriers shown in FIG. 1. In some embodiments, a transit user may swipe a ticket or card across a reader 108, for example, so that the individual may pass through a gate barrier 106 at gate 130-2 or gate 130-3 to gain access to a restricted access area 102 from a non-restricted access area 104. Such an implementation may generally be effective to prevent or at least hinder fare evasion. For example, when a particular ticket or card does not have sufficient funds or is invalid, the gate barrier 106 may remain closed so as to prevent the individual from entering or accessing the restricted access area 102. It will be appreciated however that gates employing barriers may serve as a congestion point during relatively high passenger volume periods.

To address this and other issues associated with the gates employing barriers, such as gate 130-2 and gate 130-3, the gate array 100 may comprise a barrierless gate, such as gate 130-1. In general, a barrierless gate defines an unimpeded or open passageway that separates the non-restricted access area 104 from the restricted access area 102. In some embodiments, one or more gates within the gate array 100 may be RFID enabled such that RFID transceivers 112 may be equipped along the gate cabinets 110 to detect RFID tags carried by individuals as they approach gate 130-1 to access the restricted access area 102 from the non-restricted access area 104. RFID-enabled gate 130-1 may be equipped with additional sensors 114 for identifying and tracking transit users moving through the passageway. The additional sensors 114 may comprise cameras, smart card validators, infrared emitters and receivers, time of flight sensors, ultrasonic sensors, and the like. Information from the additional sensors 114 may be used to increase the accuracy of the RFID sensors 112, corroborate information gathered by the RFID sensors 112, or may be used as a backup system when the RFID sensors 112 fail to function properly. The gate array 100 may comprise monitors 116 for displaying information useful both to individuals entering the restricted access area 102 and for security personnel. Information that may be displayed on the monitors 116 may include instructions to slow down or speed up so that the RFID sensors 112 and additional sensors 114 may function properly, or may include information regarding an individual's specific transit status, such as "Train departs in 3 minutes". Upon validation, the transit user may pass freely without encountering any obstacle or barrier through barrierless RFID-enabled gate 130-1 to access the restricted access area 102 from the non-restricted access area 104.

In some embodiments, the RFID sensors 112 may be positioned on or near the gate cabinets 110. In some embodiments, the RFID sensors 112 may be positioned within a threshold distance of the gate cabinets 110. The threshold distance may be determined based on several factors, such as the transmitted power of the RFID transmitters, the transmitted power of the RFID tags, and the like. In some embodiments, the threshold distance may be 1 meter, 2 meters, 5 meters, 10 meters, 20 meters, and the like.

Figure 2:
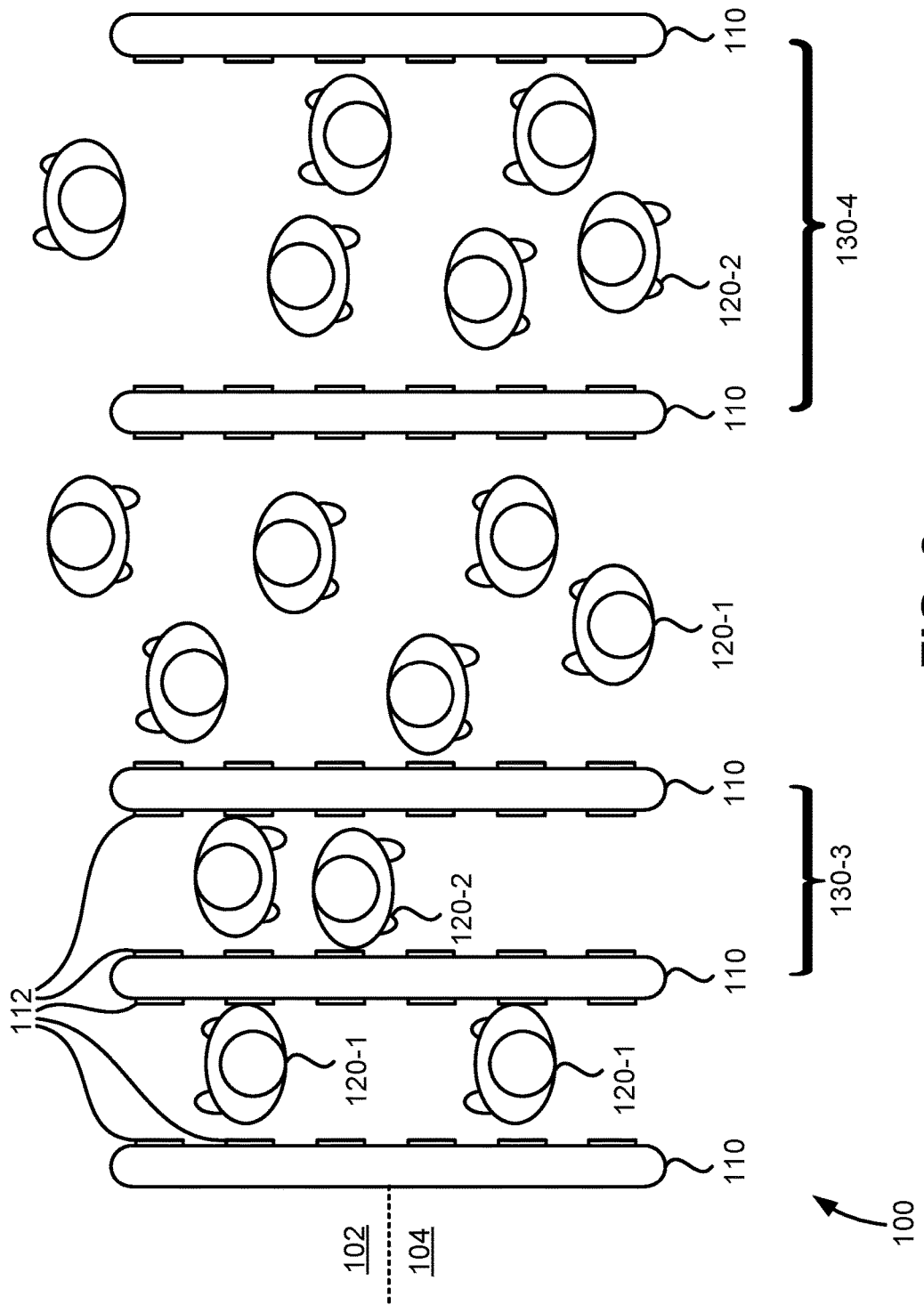
FIG. 2 shows a top view of a gate array, according to some embodiments of the present disclosure.

FIG. 2 shows a top view of the gate array 100 being accessed by users 120, according to some embodiments of the present disclosure. In some embodiments, the gate array 100 may comprise gates exclusively for entering users 120-1 or exiting users 120-2, such as gate 130-3, and/or may comprise gates with a sufficiently large passageway to accommodate users both entering and exiting the restricted access area 102, such as gate 130-4. In some embodiments, the RFID transceivers 112 may be equipped along the gate cabinets 110 to detect RFID tags carried by users 120 as they approach and pass through the RFID-enabled gates 130. In some embodiments, the RFID transceivers 112 may comprise RFID transmitters, RFID receivers, or a combination of the two. For example, gate 130-3 may include RFID transmitters on the left gate cabinet 110 and RFID receivers on the right gate cabinet 110. In other embodiments, gate 130-3 may include a single RFID transmitter and a plurality of RFID receivers on both the left gate cabinet 110 and the right gate cabinet 110. In some embodiments, the RFID transceivers 112 are not positioned on the gate cabinets 110 but are placed on the floor, the ceiling, or another suitable location within a threshold distance of the gate array 100.

Figure 3:
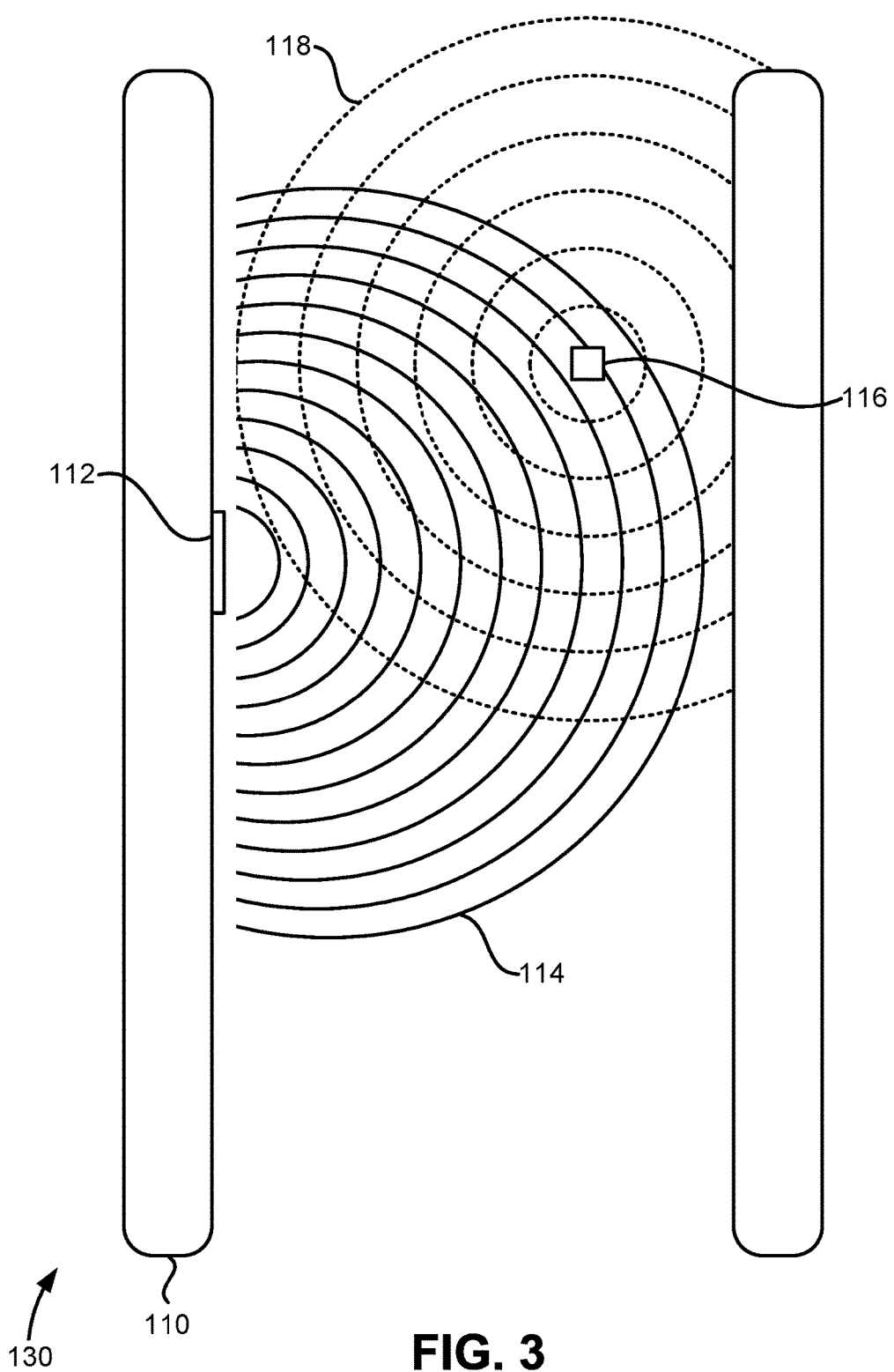
FIG. 3 shows a top view of an RFID-enabled gate, according to some embodiments of the present disclosure.

FIG. 3 shows a top view of the RFID-enabled gate 130, according to some embodiments of the present disclosure. In some embodiments, a single RFID transceiver 112 may emit electromagnetic waves which comprise electromagnetic fields 114 which reach an RFID tag 116 as it passes though the RFID-enabled gate 130. In response to receiving the electromagnetic fields 114 from the RFID transceiver 112, the RFID tag 116 may emit electromagnetic fields 118 containing identification information. Both the electromagnetic fields 114 emitted by the RFID transceiver 112 and the electromagnetic fields 118 emitted by the RFID tag 116 comprise a frequency, phase, and magnitude (i.e., amplitude) at which they are emitted. The values of the frequency, phase, and magnitude of the electromagnetic fields 114 when transmitted by the RFID transceiver 112 may be different that the values that are received by the RFID tag 116. Similarly, the values of the frequency, phase, and magnitude of the electromagnetic fields 116 when transmitted by the RFID tag 116 may be different that the values that are received by the RFID transceiver 112. For example, in general the received electric power by an antenna decreases by $1/D^2$ where D is the distance between the transmitting antenna and the receiving antenna. Variations in transmitted and received frequency and phase may occur due to the phenomenon known as the Doppler effect, which occurs when a receiving antenna is moving in reference to the transmitting antenna.

Figure 4:
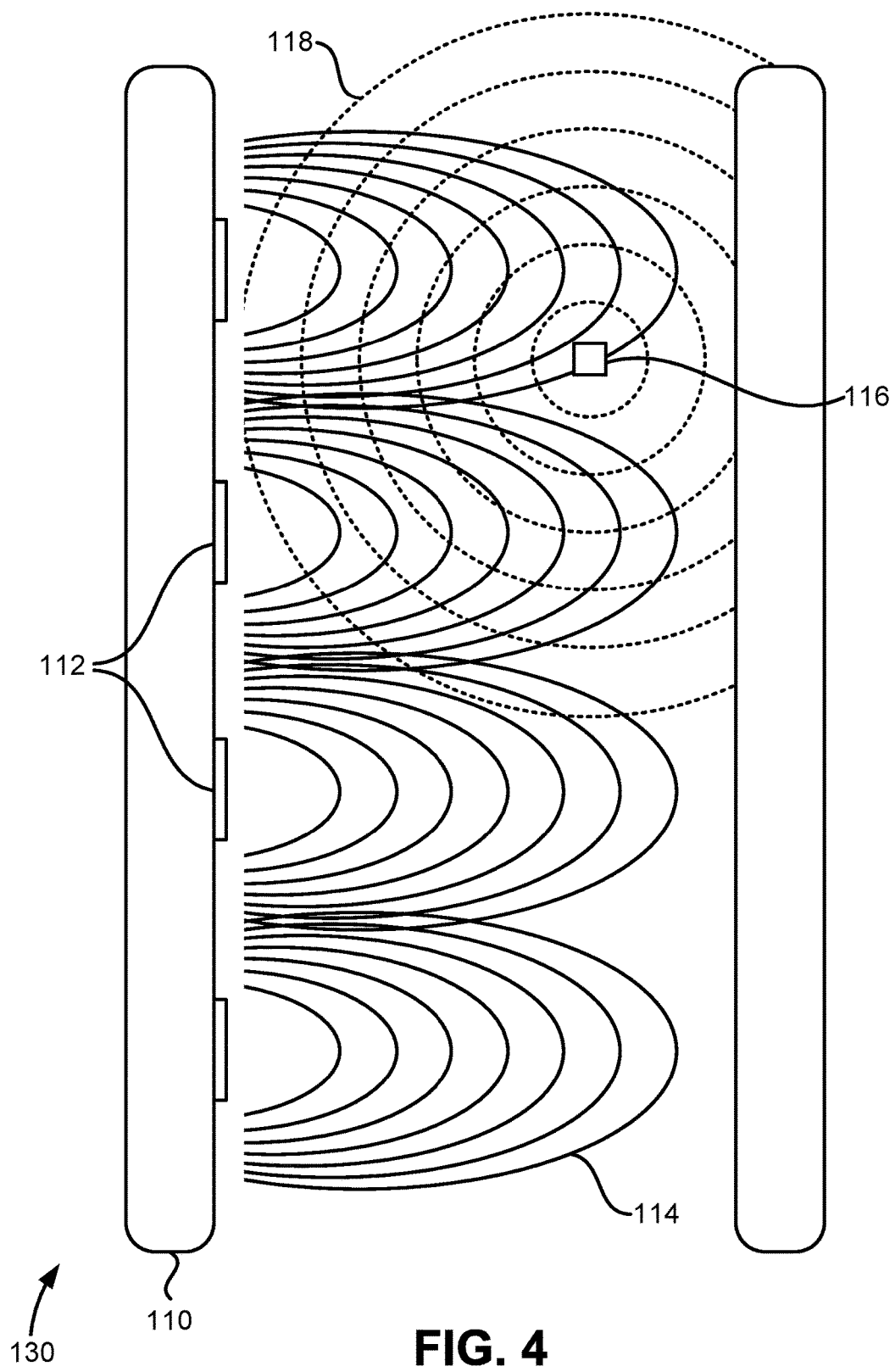
FIG. 4 shows a top view of an RFID-enabled gate, according to some embodiments of the present disclosure.

FIG. 4 shows a top view of the RFID-enabled gate 130, according to some embodiments of the present disclosure. The RFID-enabled gate 130 shown in FIG. 4 includes multiple transceivers 112 on a single gate cabinet 110 in contrast to the gates shown in FIGS. 1 and 2, which include RFID transceivers 112 on both left and right gate cabinets 110. The electromagnetic fields 114 of the RFID transceivers 112 may be configured to maximize coverage of the passageway of the RFID-enabled gate 130 through use of narrow beam antennas. In some embodiments, the electromagnetic fields 114 may have minimal overlap between adjacent RFID transceivers 112 as shown in FIG. 4. In other embodiments, the electromagnetic fields 114 of adjacent RFID transceivers 112 may have no overlap or significant overlap.

Figure 5:
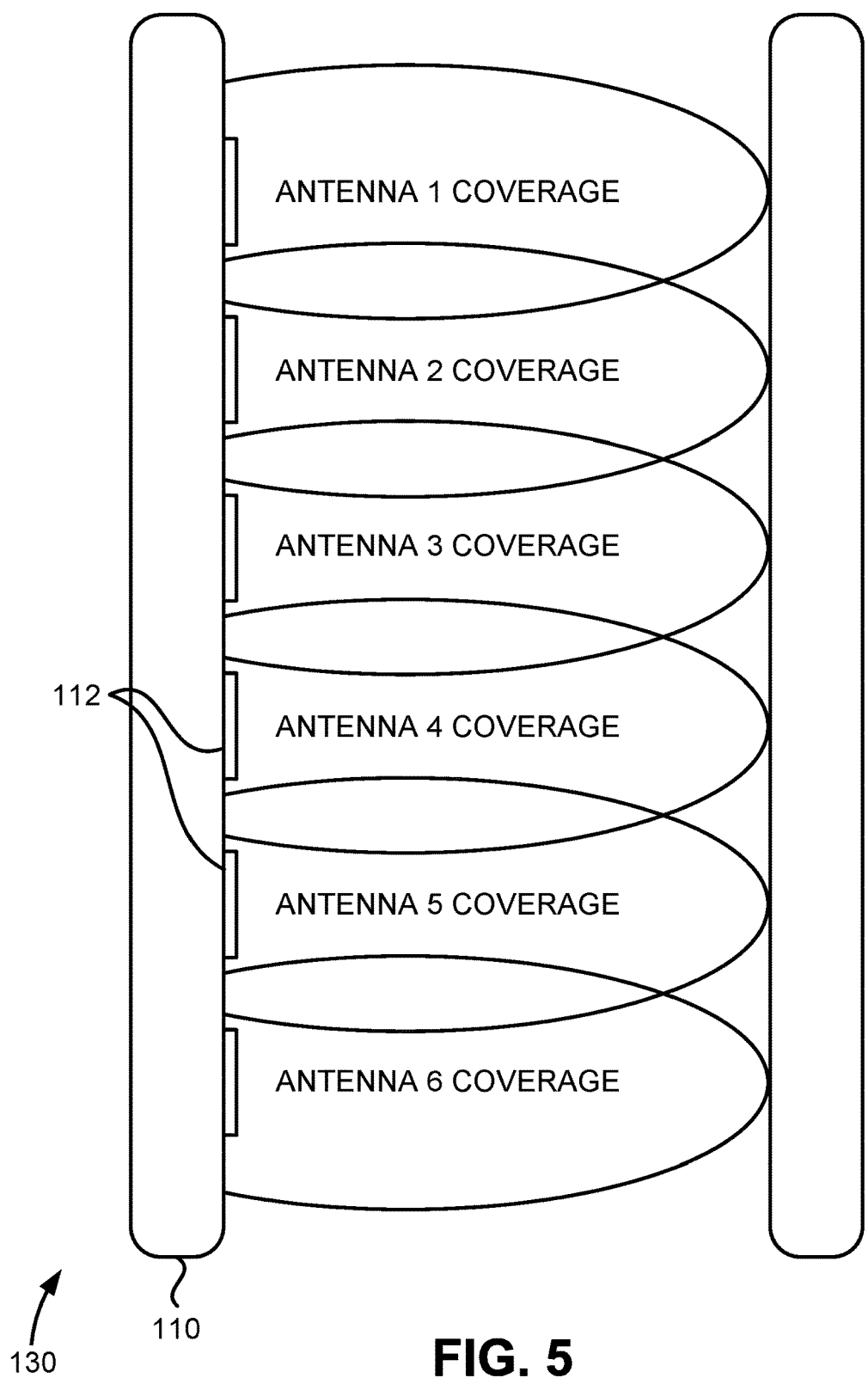
FIG. 5 shows a top view of an RFID-enabled gate, according to some embodiments of the present disclosure.

FIG. 5 shows a top view of the RFID-enabled gate 130, according to some embodiments of the present disclosure. The radiation patterns (labeled as antenna coverage) shown for the RFID receivers 112 demonstrate how certain locations in the passageway may have "dead spots" where no radiation patterns cover. In some embodiments, the dead spots may be minimized through several techniques including: employing antennas on both the left and right gate cabinets 110, increasing the number of antennas on each or both of the gate cabinets 110, and widening the beam of each antenna's radiation pattern.

Figure 6:
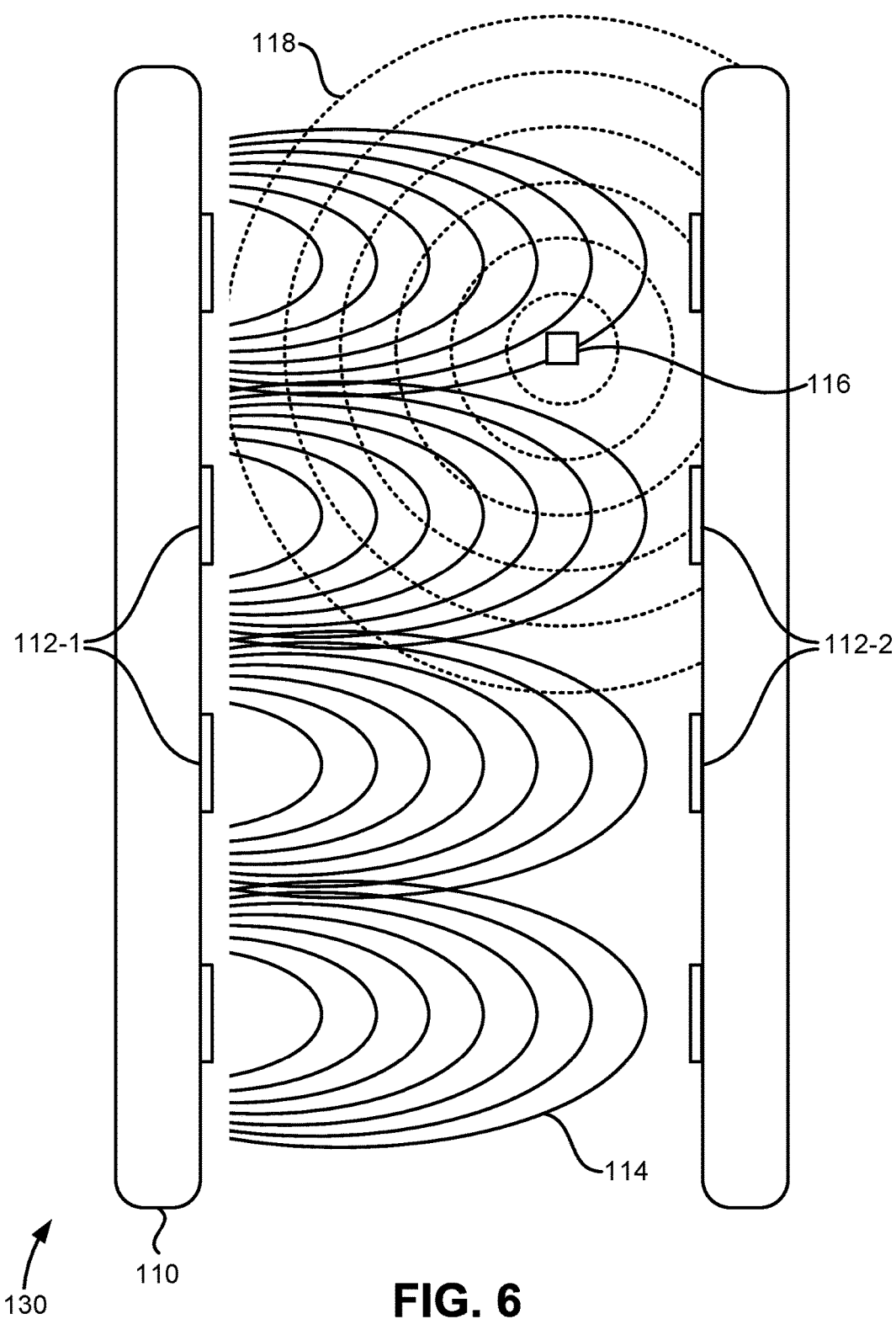
FIG. 6 shows a top view of an RFID-enabled gate, according to some embodiments of the present disclosure.

FIG. 6 shows a top view of the RFID-enabled gate 130, according to some embodiments of the present disclosure. The RFID-enabled gate 130 shown in FIG. 6 comprises RFID transmitters 112-1 positioned on the left gate cabinet 110 and RFID receivers 112-2 positioned on the right gate cabinet 110. One advantage of separating transmitters and receivers may be an increased simplicity of the data analysis.

Figure 7:
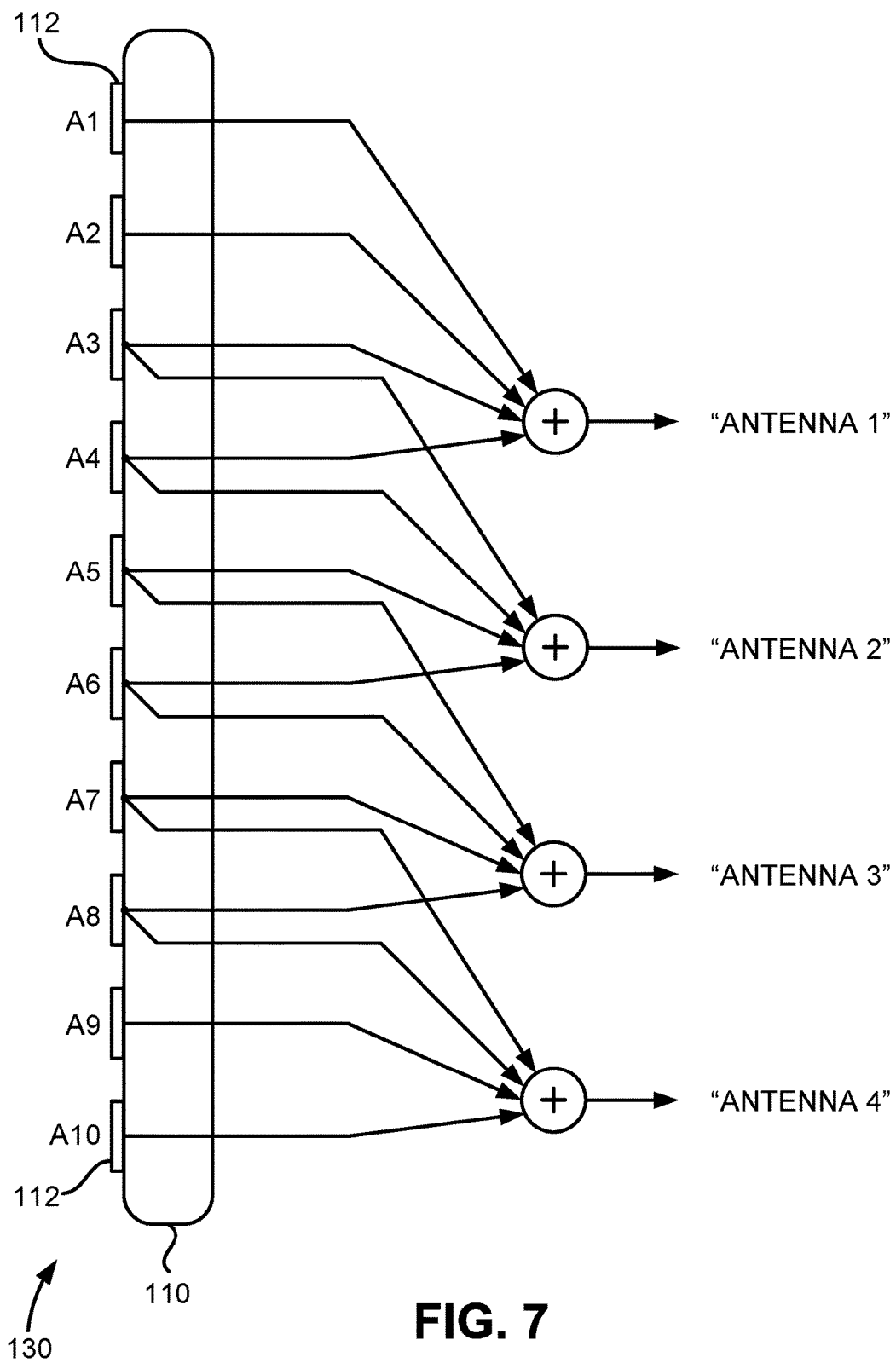
FIG. 7 shows a top view of an RFID-enabled gate with phased-array antennas, according to some embodiments of the present disclosure.

FIG. 7 shows a top view of the RFID-enabled gate 130 with phased-array antennas, according to some embodiments of the present disclosure. Different combinations of the RFID transceivers 112 as elements of each phased-array antenna may improve the beam forming capabilities of the overall system. The phased-array antennas may function by modifying the phase of each of the RFID transceivers 112 to create the desired radiation pattern. In some embodiments, the beam may be steered to follow a user as they pass through the passageway of the RFID-enabled gate 130. This may improve the RFID fare collection system's ability to read and/or write to the RFID tag 116 carried by the user.

Figure 8:
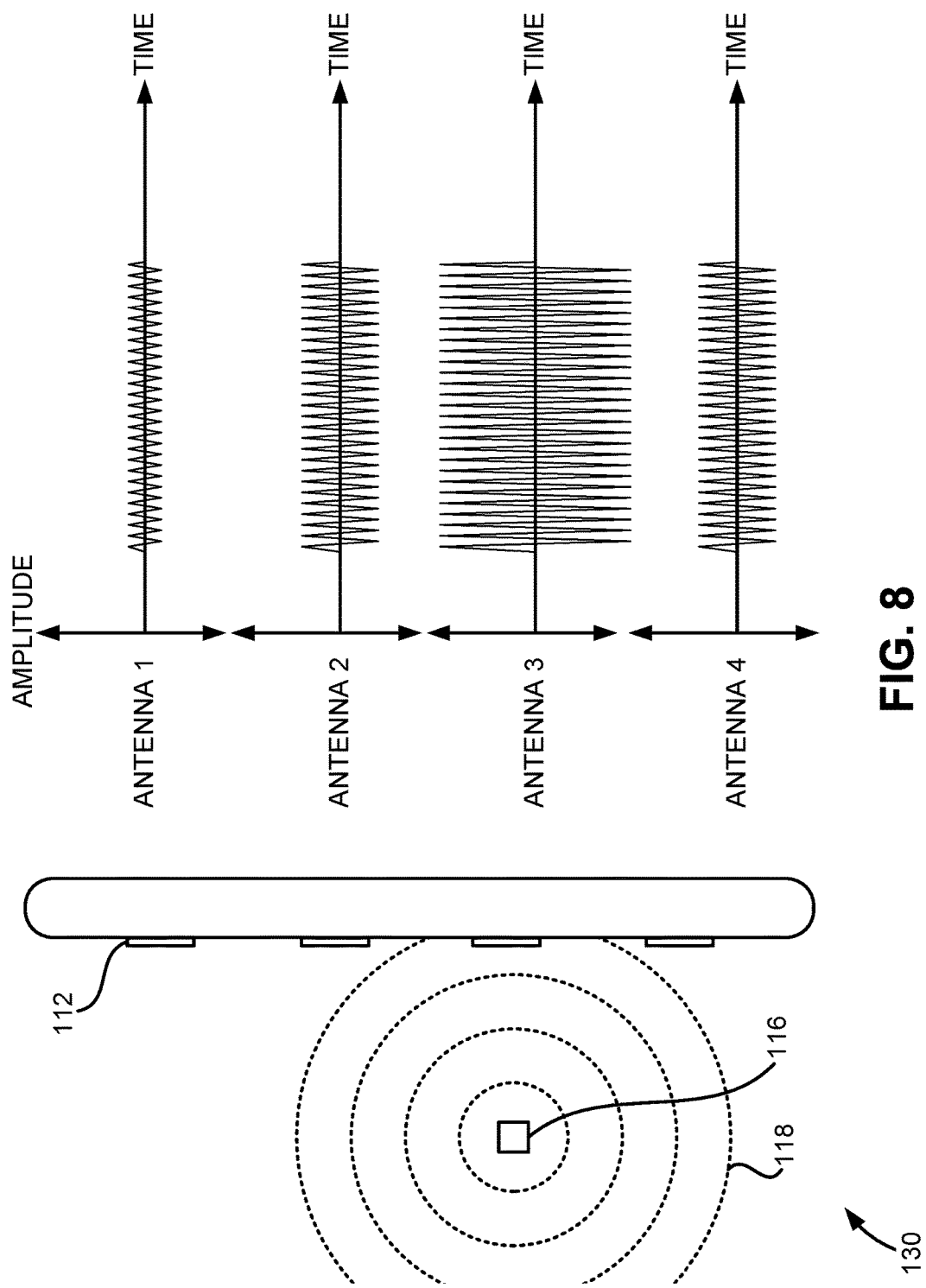
FIG. 8 shows a top view of an RFID-enabled gate alongside received signal plots, according to some embodiments of the present disclosure.

FIG. 8 shows a top view of the RFID-enabled gate 130 alongside received signal plots, according to some embodiments of the present disclosure. In some embodiments, the RFID fare collection system may perform localization of the RFID tag 116 while it is within the passageway of the RFID-enabled gate 130. In some embodiments, RFID localization is performed using received signal strength. For example, the RFID fare collection system may determine that the RFID tag 116 is near the receiver with the largest amplitude in received signal strength. The received signal strengths shown in FIG. 8 may therefore indicate that the RFID tag 116 is closest to antenna 3 because the signal amplitude received by antenna 3 is larger than the signal amplitudes received by antennas 1, 2, and 4.

Figure 9A:
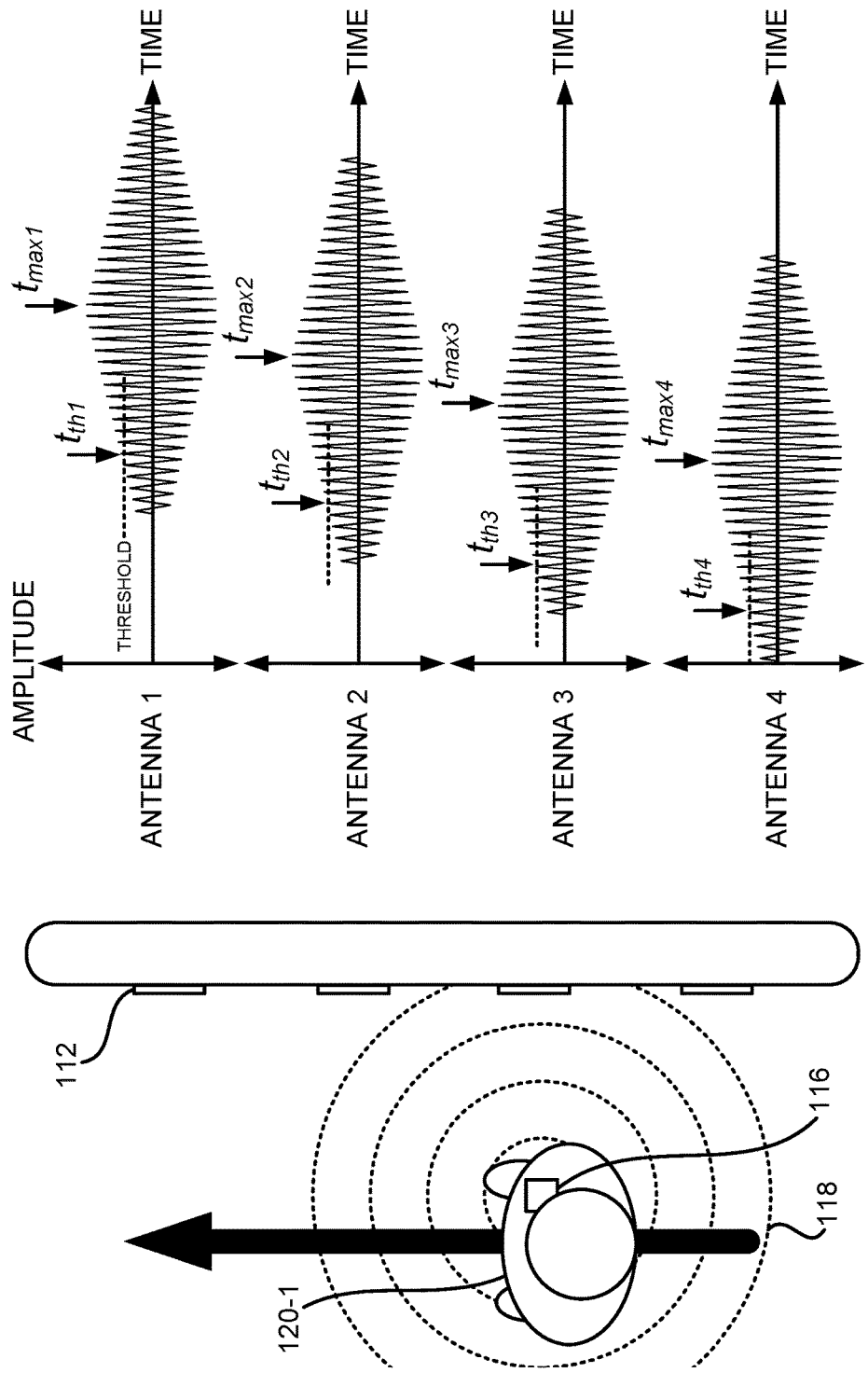
FIGS. 9A and 9B show various embodiments of an RFID-enabled gate alongside received signal plots.
Figure 9B:
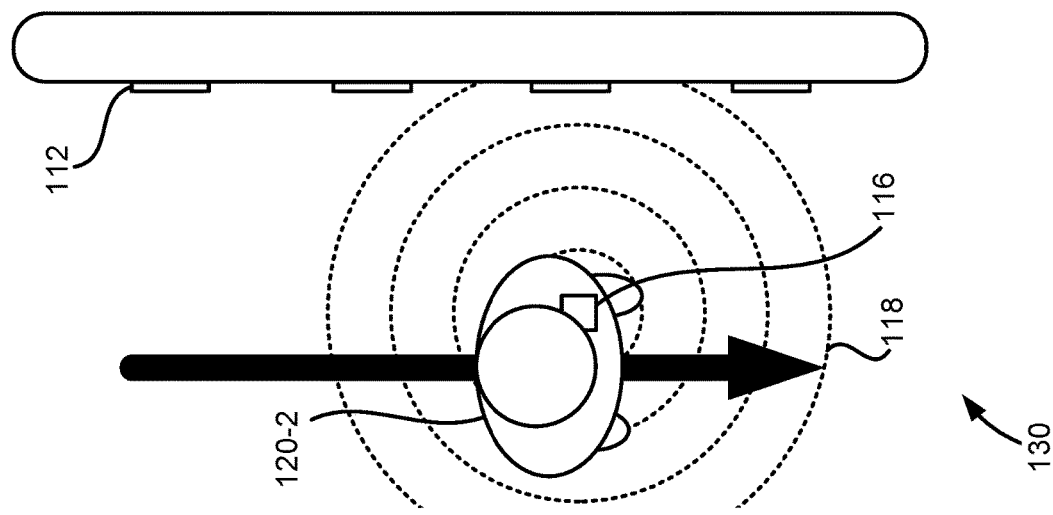
Figure 9B:
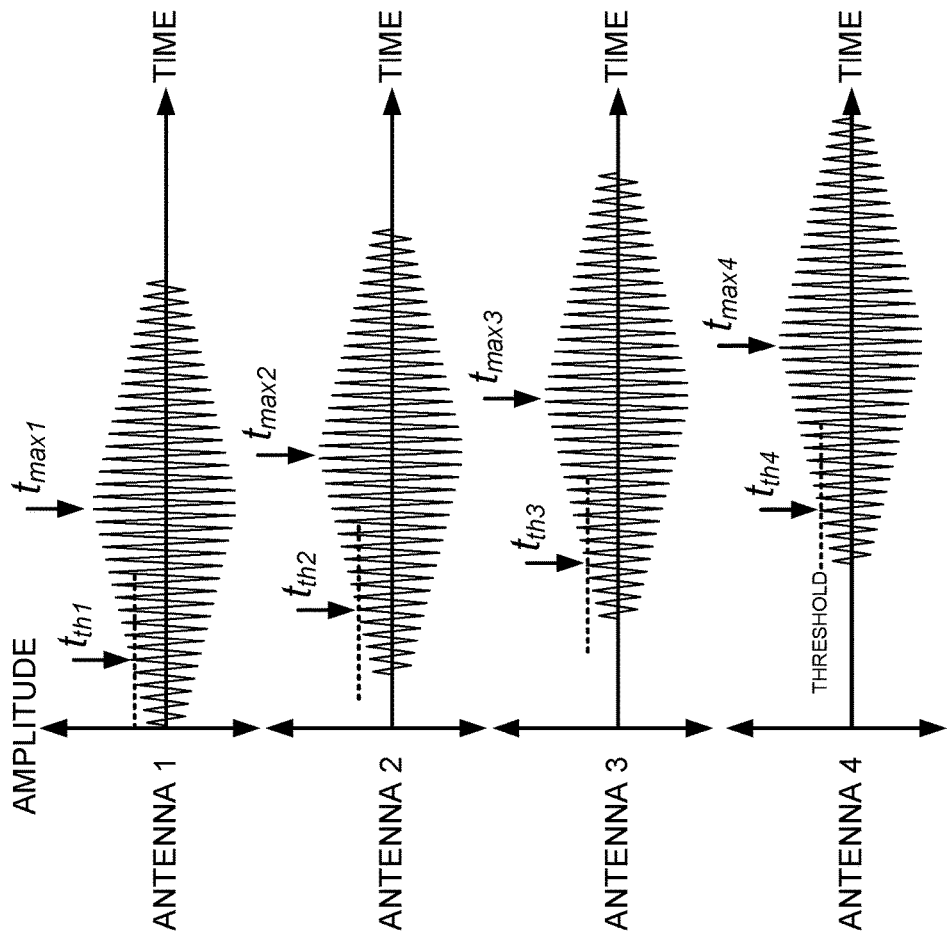

FIGS. 9A and 9B show various embodiments of the RFID-enabled gate 130 alongside received signal plots. FIG. 9A demonstrates how the RFID fare collection system may determine the direction the user 120 is moving, and therefore determine whether the user is entering or exiting the restricted access area 102. In some embodiments, the RFID fare collection system may determine the direction the user is moving based on received signal amplitude. There are two main approaches that may be employed.

The first approach for determining user direction based on signal amplitude may involve determining the maximum amplitude of the received signals at the RFID transceivers 112 and then determining the time at which the maximum amplitude occurs at each antenna. For example, the RFID fare collection system may determine the following times: $t_{max1}$ for antenna 1, $t_{max2}$ for antenna 2, $t_{max3}$ for antenna 3, and $t_{max4}$ for antenna 4. Next, the times at which the maximum amplitudes occur may be compared to each other. The direction the user is moving may be determined based on which direction the RFID transceivers 112 are positioned that have later times at which maximum amplitudes occur. For example, because $t_{max4} < t_{max3} < t_{max2} < t_{max1}$, it may be determined that the user passed the respective RFID transceivers 112 in the same order, and therefore it may be determined that the user 120-1 is entering the restricted access area 102. It should be noted that the first approach does not necessarily require that the maximum amplitude for each antenna be found, only the time at which the maximum amplitude occurs.

The second approach for determining user direction based on signal amplitude may involve determining the time at which the amplitude of the received signals at the RFID transceivers 112 surpass an amplitude threshold. In some embodiments, this may either be the time when the amplitude of the received signal first surpasses the amplitude threshold, or may be the time when the amplitude of the received signal first surpasses and stays above the amplitude threshold for a reasonable amount of time. For example, the RFID fare collection system may determine the following times: $t_{th1}$ for antenna 1, $t_{th2}$ for antenna 2, $t_{th3}$ for antenna 3, and $t_{th4}$ for antenna 4. Next, the times at which the amplitudes surpass the amplitude threshold may be compared to each other. The direction the user is moving may be determined based on which direction the RFID transceivers 112 are positioned that have later times at which the amplitudes surpass the amplitude threshold. For example, because $t_{th4} < t_{th3} < t_{th2} < t_{th1}$, it may be determined that the user passed the respective RFID transceivers 112 in the same order, and therefore it may be determined that the user 120-1 is entering the restricted access area 102. The value of the amplitude threshold may set based on various considerations, such as the signal-to-noise ratio (SNR), signal-to-interference ratio (SIR), signal-to-interference-plus-noise ratio (SINR), and the like. In general, it may be important to set the value of the amplitude threshold to a level above the noise floor to avoid false positives set off by the system misinterpreting noise as received signal.

FIG. 9B shows how the same two approaches described in reference to FIG. 9A may determine that a user 120-2 is exiting the restricted access area 102. Using the first approach, the RFID fare collection system may determine the following times: $t_{max1}$ for antenna 1, $t_{max2}$ for antenna 2, $t_{max3}$ for antenna 3, and $t_{max4}$ for antenna 4. Next, the times at which the maximum amplitudes occur may be compared to each other. Because $t_{max1} < t_{max2} < t_{max3} < t_{max4}$, it may be determined that the user passed the respective RFID transceivers 112 in the same order, and therefore it may be determined that the user 120-2 is exiting the restricted access area 102. Using the second approach, the RFID fare collection system may determine the following times: $t_{th1}$ for antenna 1, $t_{th2}$ for antenna 2, $t_{th3}$ for antenna 3, and $t_{th4}$ for antenna 4. Next, the times at which the amplitudes surpass the amplitude threshold may be compared to each other. The direction the user is moving may be determined based on which direction the RFID transceivers 112 are positioned that have later times at which the amplitudes surpass the amplitude threshold. Because $t_{th1}<t_{th2}<t_{th3}<t_{th4}$, it may be determined that the user passed the respective RFID transceivers 112 in the same order, and therefore it may be determined that the user 120-2 is exiting the restricted access area 102.

Figure 10A:
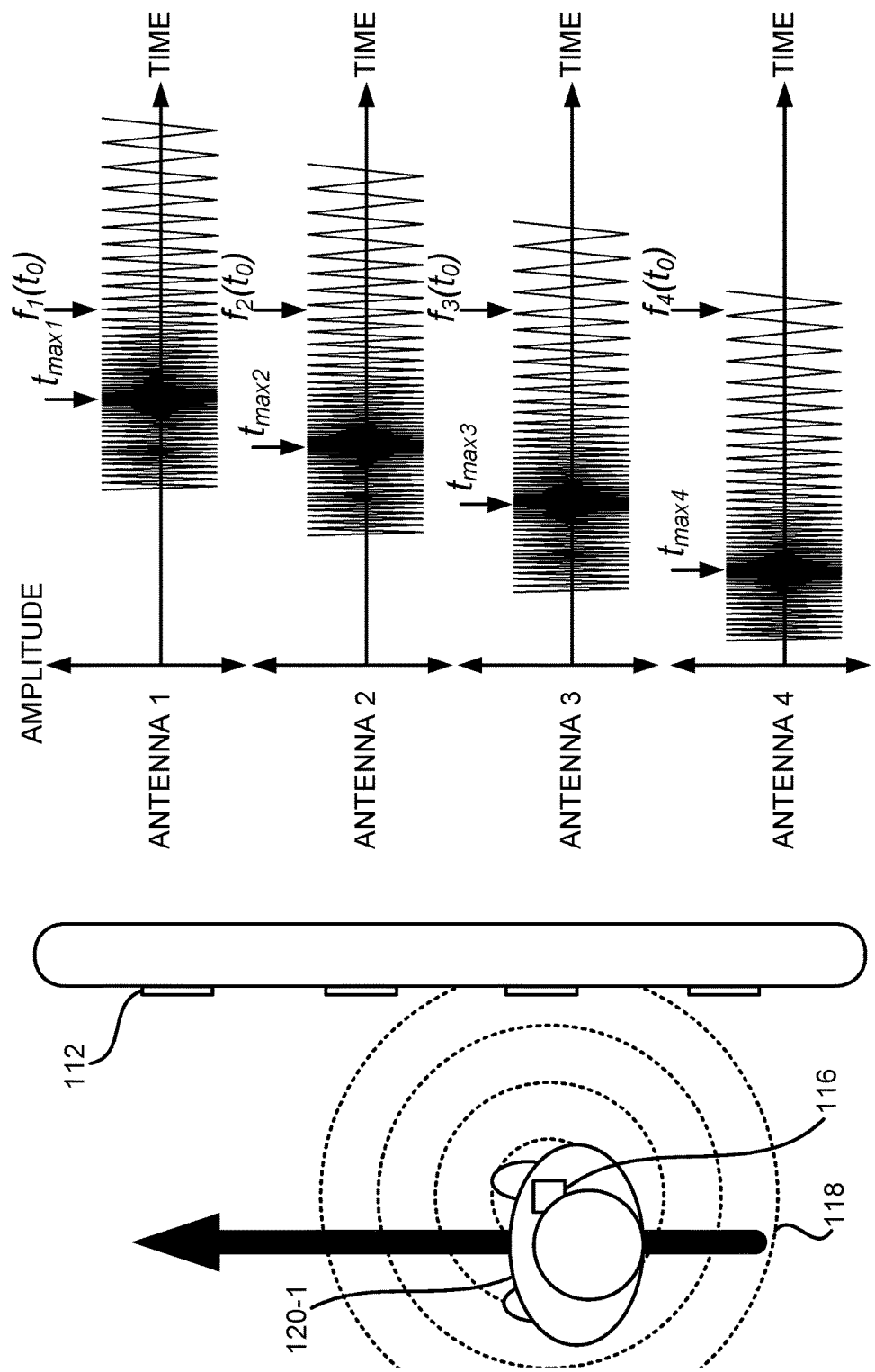
FIGS. 10A and 10B show various embodiments of an RFID-enabled gate alongside received signal plots.
Figure 10B:
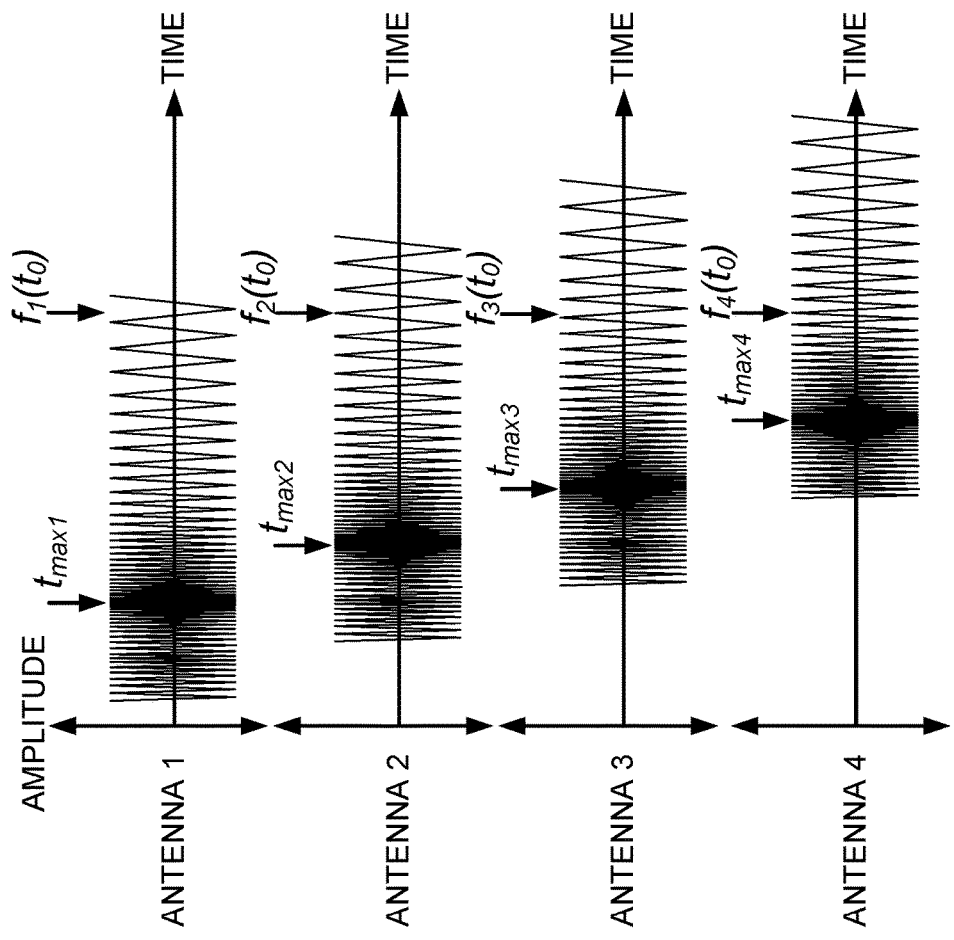
Figure 10B:
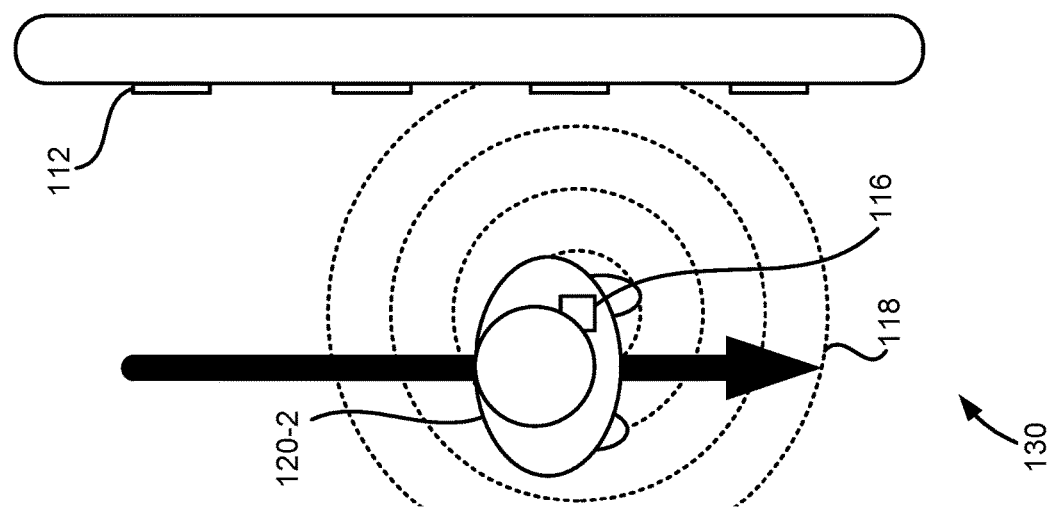

FIGS. 10A and 10B show various embodiments of the RFID-enabled gate 130 alongside received signal plots. Specifically, FIGS. 10A and 10B demonstrate how the RFID fare collection system may determine the direction the user 120 is moving based on analyzing the frequency and/or phase of the received signals at the RFID transceivers 112. Variations in the transmitted and received frequencies and phases may occur due to the phenomenon known as the Doppler effect, which occurs when a receiving antenna is moving in reference to a transmitting antenna. Here, the RFID tag 116 may be considered the transmitting antenna and one of the RFID transceivers 112 may be considered the receiving antenna. Where the RFID tag 116 is moving closer to one of the RFID transceivers 112, the frequency of the received signal may be greater than the frequency of the transmitted signal. In contrast, where the RFID tag 116 is moving away from one of the RFID transceivers 112, the frequency of the received signal may less than the frequency of the transmitted signal. There are two main approaches that may be employed.

The first approach for determining user direction based on signal frequency may involve determining the maximum frequency of the received signals at the RFID transceivers 112 and then determining the time at which the maximum frequency occurs at each antenna. For example, the RFID fare collection system may determine the following times: $t_{max1}$ for antenna 1, $t_{max2}$ for antenna 2, $t_{max3}$ for antenna 3, and $t_{max4}$ for antenna 4. Next, the times at which the maximum frequencies occur may be compared to each other. The direction the user is moving may be determined based on which direction the RFID transceivers 112 are positioned that have later times at which maximum frequencies occur. For example, because $t_{max4}<t_{max3}<t_{max2}<t_{max1}$, it may be determined that the user passed the respective RFID transceivers 112 in the same order, and therefore it may be determined that the user 120-1 is entering the restricted access area 102.

It should be noted that the first approach does not necessarily require that the maximum frequency for each antenna be found, only the time at which the maximum frequency occurs. In some embodiments, depending on where the RFID transceivers 112 are positioned and the angle of approach of the user, the frequency of the received signals may be a monotonically decreasing function. That is, the earliest detected frequency of a received signal may be equal to the maximum frequency that is detected for the received signal. Furthermore, the last detected frequency of the received signal may be equal to the minimum frequency that is detected for the received signal. This may be the case when the RFID tag 116 is moving linearly through the RFID-enabled gate 130, which may cause the velocity of the RFID tag 116 relative to the RFID transceivers 112 to be a monotonically decreasing function.

The second approach for determining user direction based on signal frequency may involve determining the frequencies of the received signals at the RFID transceivers 112 at a single instant in time. Differences in frequency at different RFID transceivers 112 may indicate which direction the user is moving. For example, at time $t_0$ where frequencies $f_1$, $f_2$, $f_3$, and $f_4$ occur, the direction the user is moving may be determined based on which direction the RFID transceivers 112 are positioned that have higher frequencies in their received signals. For example, because $f_4<f_3<f_2<f_1$, it may be determined that the user passed the respective RFID transceivers 112 in the same order, and therefore it may be determined that the user 120-1 is entering the restricted access area 102.

FIG. 10B shows how the same two approaches described in reference to FIG. 10A may determine that a user 120-2 is exiting the restricted access area 102. Using the first approach, the RFID fare collection system may determine the following times: $t_{max1}$ for antenna 1, $t_{max2}$ for antenna 2, $t_{max3}$ for antenna 3, and $t_{max4}$ for antenna 4. Next, the times at which the maximum frequencies occur may be compared to each other. Because $t_{max1}<t_{max2}<t_{max3}<t_{max4}$, it may be determined that the user passed the respective RFID transceivers 112 in the same order, and therefore it may be determined that the user 120-1 is exiting the restricted access area 102. Using the second approach, the RFID fare collection system may determine the following frequencies at time $t_0$: $f_1$, $f_2$, $f_3$, and $f_4$. The direction the user is moving may be determined based on which direction the RFID transceivers 112 are positioned that have higher frequencies in their received signals. For example, because $f_1<f_2<f_3<f_4$, it may be determined that the user passed the respective RFID transceivers 112 in the same order, and therefore it may be determined that the user 120-2 is exiting the restricted access area 102.

In some embodiments, the RFID fare collection system may determine the direction the user 120 is moving based on analyzing the phase of the received signals at the RFID transceivers 112. In many situations, variations in the transmitted and received phases may be more easily detected than variations in the transmitted and received frequencies. This is particularly true when a user is moving slowly through the RFID-enabled gate. In some embodiments, when the phase of the received signal at an RFID transceiver decreases over time, it may be determined that the user is entering the restricted access area 102. In some embodiments, where the phase of the received signal at an RFID transceiver increases over time, it may be determined that the user is exiting the restricted access area 102. The direction the user is moving may also be determined based on a comparison of the phases of the received signals at RFID transceivers 112 at a single instant or over a period of time.

Figure 11:
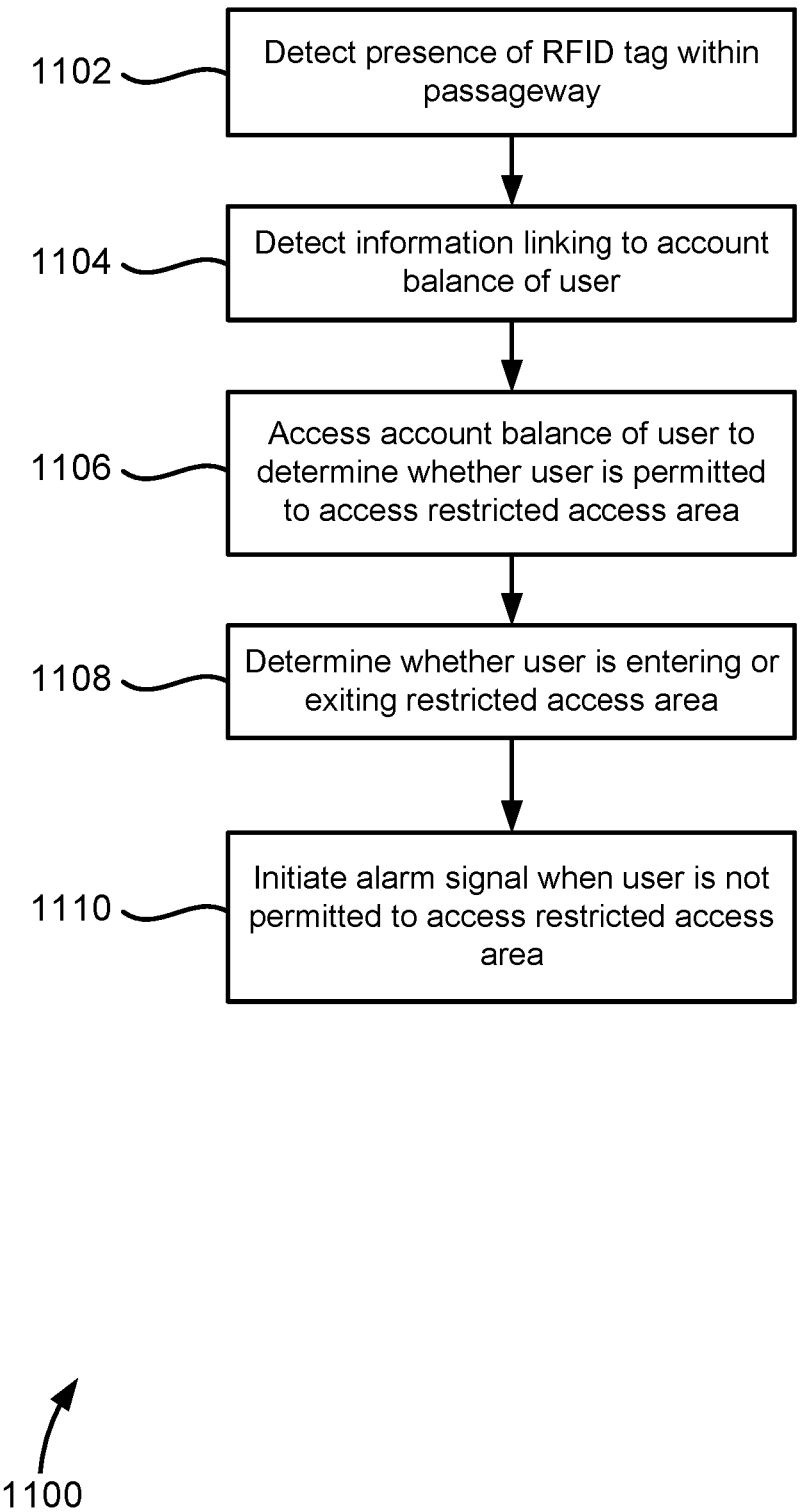
FIG. 11 shows a method, according to some embodiments of the present disclosure.

FIG. 11 shows a method 1100, according to some embodiments of the present disclosure. The steps of method 1100 need not be performed in the order listed, and not all of the steps listed need be performed. At step 1102, the RFID fare collection system detects the presence of the RFID tag 116 within the passageway of the RFID-enabled gate 130. At step 1104, information linking to the account balance of the user is detected. At step 1106, the account balance of the user is accessed to determine whether the user is permitted to access the restricted access area 102. The RFID fare collection system may further withdraw funds from the user's account balance based on the type of fare collection system that is being employed. For example, if the fare collection system is a flat fare system, a withdrawal from the user's account balance may be performed when the user is first entering the restricted access area. If the fare collection system is a distance-based fare system, a withdrawal may not occur until the user finally exits the restricted access area so that the fare collection system can determine the distance traveled within the transit system by the user. Even in a distance-based fare system, a determination may be made whether an entering user has sufficient funds to travel any distance within the transit system.

At step 1108, it is determined whether the user is entering or exiting the restricted access area. Step 1108 may be performed prior to steps 1102, 1104, and 1106, as it may facilitate the operations of those steps or may cause those steps to be omitted. For example, in a flat fare system, the RFID fare collection system may ignore users that are exiting the restricted access area 102. Furthermore, in a distance-based fare system, before a withdrawal from the user's account balance is performed, it may need to be first determined whether the user is entering or exiting the restricted access area. At step 1110, an alarm signal is initiated when the user is not permitted to access the restricted access area 102. The alarm signal may comprise an audible alarm that alerts security personnel in the vicinity of the RFID-enabled gate 130.

FIGS. 12A, 12B, 12C and 12D show various embodiments of a method 1108 for determining whether a user is entering or exiting the restricted access area 102. The different embodiments of method 1108 may be used for step 1108 of FIG. 11. In reference to FIG. 12A, at step 1202, the RFID fare collection system detects receipt of a first received wireless signal having a first maximum amplitude at a first instant in time. At step 1204, the system detects receipt of a second received wireless signal having a second maximum amplitude at a second instant in time. At step 1206, the first instant in time is compared with the second instant in time to determine whether the user is entering or exiting the restricted access area 102.

Figure 12A:
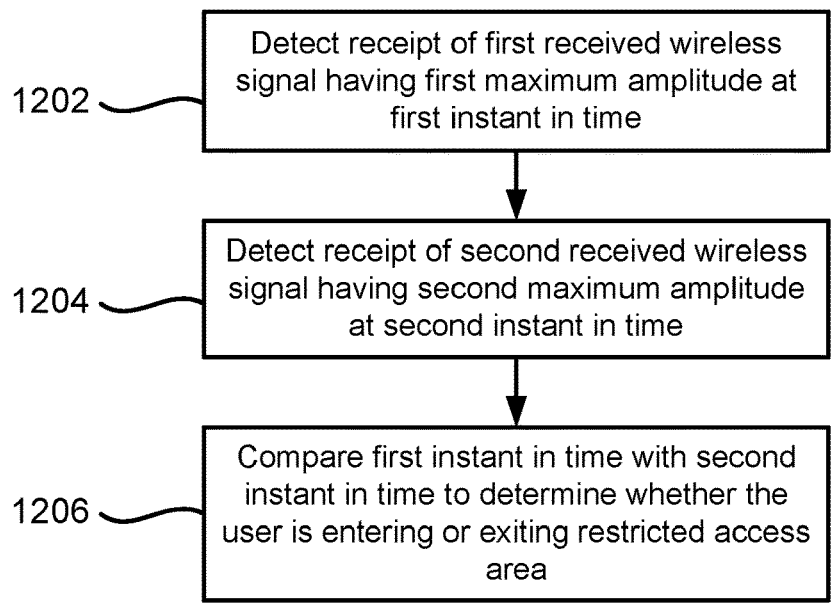
FIGS. 12A, 12B, 12C, and 12D show various embodiments of a method for determining whether a user is entering or exiting a restricted access area.
Figure 12B:
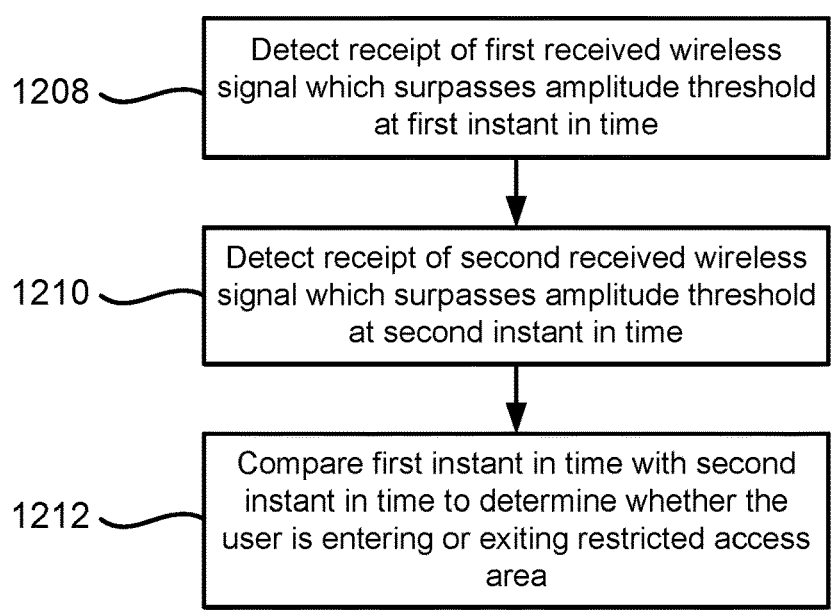

In reference to FIG. 12B, at step 1208, the RFID fare collection system detects receipt of a first received wireless signal which surpasses an amplitude threshold at a first instant in time. At step 1210, the system detects receipt of a second received wireless signal which surpasses the amplitude threshold at a second instant in time. At step 1212, the first instant in time is compared with the second instant in time to determine whether the user is entering or exiting the restricted access area 102.

Figure 12C:
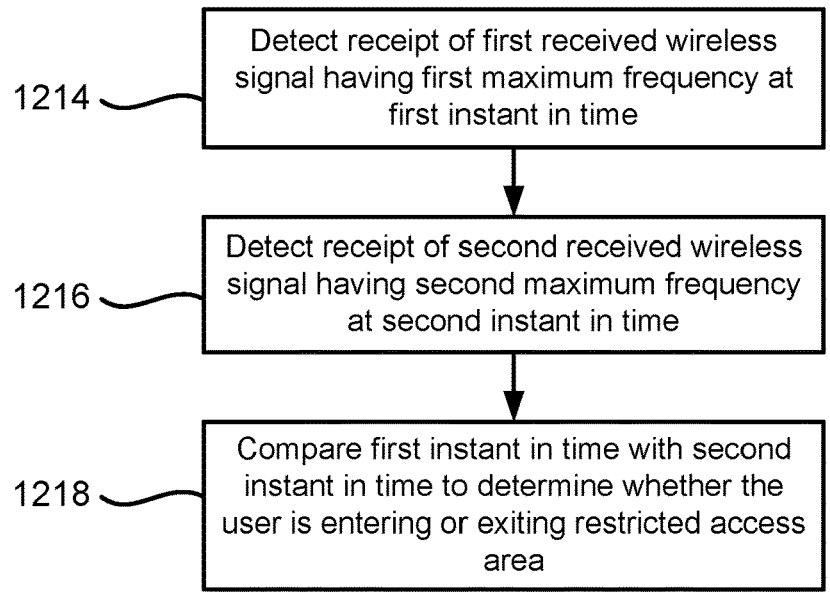

In reference to FIG. 12C, at step 1214, the RFID fare collection system detects receipt of a first received wireless signal having a first maximum frequency at a first instant in time. At step 1216, the system detects receipt of a second received wireless signal having a second maximum frequency at a second instant in time. At step 1218, the first instant in time is compared with the second instant in time to determine whether the user is entering or exiting the restricted access area 102.

Figure 12D:
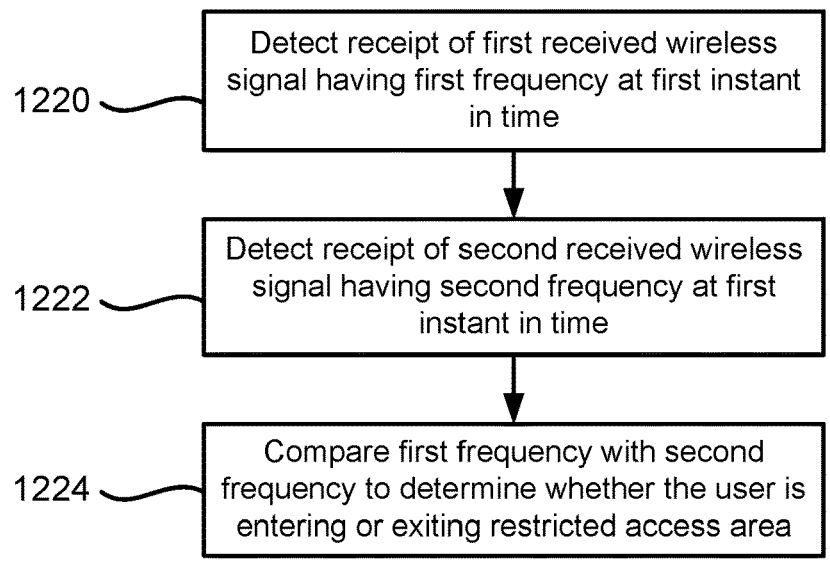

In reference to FIG. 12D, at step 1220, the RFID fare collection system detects receipt of a first received wireless signal having a first frequency at a first instant in time. At step 1222, the system detects receipt of a second received wireless signal having a second frequency at the first instant in time. At step 1224, the first frequency is compared with the second frequency to determine whether the user is entering or exiting the restricted access area 102.

Figure 13:
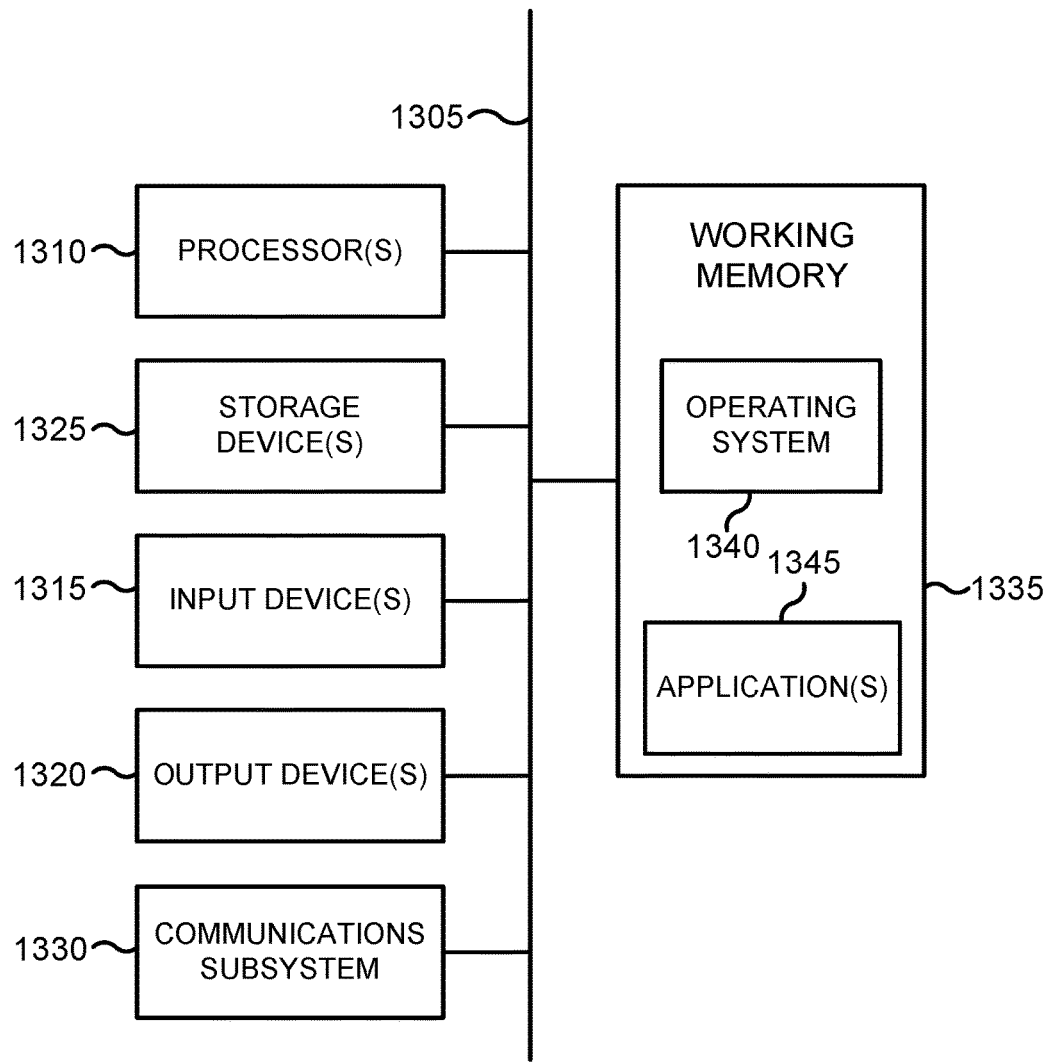
FIG. 13 shows a simplified computer system, according to some embodiments of the present disclosure.

FIG. 13 illustrates a simplified computer system, according to some embodiments of the present disclosure. A computer system 1300 as illustrated in FIG. 13 may be incorporated into devices such as a portable electronic device, mobile phone, or other device as described herein. FIG. 13 provides a schematic illustration of one embodiment of a computer system 1300 that can perform some or all of the steps of the methods provided by various embodiments. It should be noted that FIG. 13 is meant only to provide a generalized illustration of various components, any or all of which may be utilized as appropriate. FIG. 13, therefore, broadly illustrates how individual system elements may be implemented in a relatively separated or relatively more integrated manner.

The computer system 1300 is shown comprising hardware elements that can be electrically coupled via a bus 1305, or may otherwise be in communication, as appropriate. The hardware elements may include one or more processors 1310, including without limitation one or more general-purpose processors and/or one or more special-purpose processors such as digital signal processing chips, graphics acceleration processors, and/or the like; one or more input devices 1315, which can include without limitation a mouse, a keyboard, a camera, and/or the like; and one or more output devices 1320, which can include without limitation a display device, a printer, and/or the like.

The computer system 1300 may further include and/or be in communication with one or more non-transitory storage devices 1325, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

The computer system 1300 might also include a communications subsystem 1330, which can include without limitation a modem, a network card (wireless or wired), an infrared communication device, a wireless communication device, and/or a chipset such as a Bluetooth™ device, an 802.11 device, a WiFi device, a WiMax device, cellular communication facilities, etc., and/or the like. The communications subsystem 1330 may include one or more input and/or output communication interfaces to permit data to be exchanged with a network such as the network described below to name one example, other computer systems, television, and/or any other devices described herein. Depending on the desired functionality and/or other implementation concerns, a portable electronic device or similar device may communicate image and/or other information via the communications subsystem 1330. In other embodiments, a portable electronic device, e.g. the first electronic device, may be incorporated into the computer system 1300, e.g., an electronic device as an input device 1315. In some embodiments, the computer system 1300 will further comprise a working memory 1335, which can include a RAM or ROM device, as described above.

The computer system 1300 also can include software elements, shown as being currently located within the working memory 1335, including an operating system 1340, device drivers, executable libraries, and/or other code, such as one or more application programs 1345, which may comprise computer programs provided by various embodiments, and/or may be designed to implement methods, and/or configure systems, provided by other embodiments, as described herein. Merely by way of example, one or more procedures described with respect to the methods discussed above, such as those described in relation to FIG. 13, might be implemented as code and/or instructions executable by a computer and/or a processor within a computer; in an aspect, then, such code and/or instructions can be used to configure and/or adapt a general purpose computer or other device to perform one or more operations in accordance with the described methods.

A set of these instructions and/or code may be stored on a non-transitory computer-readable storage medium, such as the storage device(s) 1325 described above. In some cases, the storage medium might be incorporated within a computer system, such as computer system 1300. In other embodiments, the storage medium might be separate from a computer system e.g., a removable medium, such as a compact disc, and/or provided in an installation package, such that the storage medium can be used to program, configure, and/or adapt a general purpose computer with the instructions/code stored thereon. These instructions might take the form of executable code, which is executable by the computer system 1300 and/or might take the form of source and/or installable code, which, upon compilation and/or installation on the computer system 1300 e.g., using any of a variety of generally available compilers, installation programs, compression/decompression utilities, etc., then takes the form of executable code.

It will be apparent to those skilled in the art that substantial variations may be made in accordance with specific requirements. For example, customized hardware might also be used, and/or particular elements might be implemented in hardware, software including portable software, such as applets, etc., or both. Further, connection to other computing devices such as network input/output devices may be employed.

As mentioned above, in one aspect, some embodiments may employ a computer system such as the computer system 1300 to perform methods in accordance with various embodiments of the technology. According to a set of embodiments, some or all of the procedures of such methods are performed by the computer system 1300 in response to processor 1310 executing one or more sequences of one or more instructions, which might be incorporated into the operating system 1340 and/or other code, such as an application program 1345, contained in the working memory 1335. Such instructions may be read into the working memory 1335 from another computer-readable medium, such as one or more of the storage device(s) 1325. Merely by way of example, execution of the sequences of instructions contained in the working memory 1335 might cause the processor(s) 1310 to perform one or more procedures of the methods described herein. Additionally or alternatively, portions of the methods described herein may be executed through specialized hardware.

The terms "machine-readable medium" and "computer-readable medium," as used herein, refer to any medium that participates in providing data that causes a machine to operate in a specific fashion. In an embodiment implemented using the computer system 1300, various computer-readable media might be involved in providing instructions/code to processor(s) 1310 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the storage device(s) 1325. Volatile media include, without limitation, dynamic memory, such as the working memory 1335.

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 1310 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 1300.

The communications subsystem 1330 and/or components thereof generally will receive signals, and the bus 1305 then might carry the signals and/or the data, instructions, etc. carried by the signals to the working memory 1335, from which the processor(s) 1310 retrieves and executes the instructions. The instructions received by the working memory 1335 may optionally be stored on a non-transitory storage device 1325 either before or after execution by the processor(s) 1310.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of exemplary configurations including implementations. However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a schematic flowchart or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the technology. Also, a number of steps may be undertaken before, during, or after the above elements are considered. Accordingly, the above description does not bind the scope of the claims.

As used herein and in the appended claims, the singular forms "a", "an", and "the" include plural references unless the context clearly dictates otherwise. Thus, for example, reference to "a user" includes a plurality of such users, and reference to "the processor" includes reference to one or more processors and equivalents thereof known to those skilled in the art, and so forth.

Also, the words "comprise," "comprising," "contains," "containing," "include," "including," and "includes," when used in this specification and in the following claims, are intended to specify the presence of stated features, integers, components, or steps, but they do not preclude the presence or addition of one or more other features, integers, components, steps, acts, or groups.

What is claimed is:

1. A system comprising:
   at least one entry point that defines a passageway and separates a non-restricted access area from a restricted access area;
   at least one RFID transmitter positioned on or within a threshold distance of the at least one entry point, the at least one RFID transmitter being configured to transmit wireless signals to an RFID tag, wherein the RFID tag is operable to be carried by a user when the user enters or exits the restricted access area through the passageway, the RFID tag having information linking to an account balance of the user;
   at least one RFID receiver positioned on or within the threshold distance of the at least one entry point, the at least one RFID receiver being configured to receive wireless signals from the RFID tag, wherein wireless signals received by the at least one RFID receiver from the RFID tag are indicative of the information linking to the account balance of the user, the at least one RFID receiver including a first RFID receiver and a second RFID receiver; and
   a processor communicatively coupled with the at least one RFID receiver, the processor being configured to perform operations including:
      detecting the presence of the RFID tag within the passageway;
      detecting the information linking to the account balance of the user based on the wireless signals received by the at least one RFID receiver from the RFID tag;
      detecting receipt, by the first RFID receiver, of a first received wireless signal having a first frequency at a first instant in time;
      detecting receipt, by the second RFID receiver, of a second received wireless signal having a second frequency at the first instant in time; and
      determining whether the first frequency is greater than or less than the second frequency to determine whether the user is entering or exiting the restricted access area.

2. The system of claim 1, wherein the processor is further configured to perform operations including:
   accessing the account balance of the user to determine whether the user is permitted to access the restricted access area.

3. The system of claim 2, wherein the processor is further configured to perform operations including:
   initiating an alarm signal when the user is not permitted to access the restricted access area.

4. The system of claim 1, wherein the RFID tag is passive.

5. The system of claim 1, further comprising:
   at least one RFID transceiver positioned on or within the threshold distance of the at least one entry point, the at least one RFID transceiver including the at least one RFID transmitter and the at least one RFID receiver such that the at least one RFID transmitter is integrated with the at least one RFID receiver.

6. The system of claim 1, wherein the processor is integrated with the at least one RFID receiver.

7. The system of claim 1, wherein the RFID tag is a UHF tag, the at least one RFID transmitter is a UHF transmitter, and the at least one RFID receiver is a UHF receiver.

8. A system comprising:
   at least one entry point that defines a passageway and separates a non-restricted access area from a restricted access area;
   an RFID tag operable to be carried by a user when the user enters or exits the restricted access area through the passageway, the RFID tag having information linking to an account balance of the user;
   at least one RFID transmitter positioned on or within a threshold distance of the at least one entry point, the at least one RFID transmitter being configured to transmit wireless signals to the RFID tag;
   at least one RFID receiver positioned on or within the threshold distance of the at least one entry point, the at least one RFID receiver being configured to receive wireless signals from the RFID tag, wherein wireless signals received by the at least one RFID receiver from the RFID tag are indicative of the information linking to the account balance of the user, the at least one RFID receiver including a first RFID receiver and a second RFID receiver; and
   a processor communicatively coupled with the at least one RFID receiver, the processor being configured to perform operations including:
      detecting the presence of the RFID tag within the passageway;
      detecting the information linking to the account balance of the user based on the wireless signals received by the at least one RFID receiver from the RFID tag;
      detecting receipt, by the first RFID receiver, of a first received wireless signal having a first frequency at a first instant in time;
      detecting receipt, by the second RFID receiver, of a second received wireless signal having a second frequency at the first instant in time; and
      determining whether the first frequency is greater than or less than the second frequency to determine whether the user is entering or exiting the restricted access area.

9. The system of claim 8, wherein the processor is further configured to perform operations including:
   accessing the account balance of the user to determine whether the user is permitted to access the restricted access area.

10. A method comprising:
for a system comprising:
- at least one entry point that defines a passageway and separates a non-restricted access area from a restricted access area;
- at least one RFID transmitter positioned on or within a threshold distance of the at least one entry point, the at least one RFID transmitter being configured to transmit wireless signals to an RFID tag, wherein the RFID tag is operable to be carried by a user when the user enters or exits the restricted access area through the passageway, the RFID tag having information linking to an account balance of the user;
- at least one RFID receiver positioned on or within the threshold distance of the at least one entry point, the at least one RFID receiver being configured to receive wireless signals from the RFID tag, wherein wireless signals received by the at least one RFID receiver from the RFID tag are indicative of the information linking to the account balance of the user, the at least one RFID receiver including a first RFID receiver and a second RFID receiver;

detecting the presence of the RFID tag within the passageway;

detecting the information linking to the account balance of the user based on the wireless signals received by the at least one RFID receiver from the RFID tag;

detecting receipt, by the first RFID receiver, of a first received wireless signal having a first frequency at a first instant in time;

detecting receipt, by the second RFID receiver, of a second received wireless signal having a second frequency at the first instant in time; and determining whether the first frequency is greater than or less than the second frequency to determine whether the user is entering or exiting the restricted access area.

11. The method of claim 10, further comprising:
accessing the account balance of the user to determine whether the user is permitted to access the restricted access area.

12. The method of claim 11, further comprising:
initiating an alarm signal when the user is not permitted to access the restricted access area.

13. The method of claim 10, wherein the RFID tag is passive.

* * * * *